United States Patent
Yuan et al.

(10) Patent No.: US 9,537,416 B2
(45) Date of Patent: Jan. 3, 2017

(54) SYSTEM AND METHOD FOR OPERATING POWER CONVERTERS

(71) Applicant: General Electric Company, Schenectady, NY (US)

(72) Inventors: Zhihui Yuan, Bavaria (DE); Qingyun Chen, Bavaria (DE); Stefan Schroeder, Bavaria (DE); Jie Shen, Bavaria (DE)

(73) Assignee: General Electric Company, Niskayuna, NY (US)

( * ) Notice: Subject to any disclaimer, the term of this patent is extended or adjusted under 35 U.S.C. 154(b) by 99 days.

(21) Appl. No.: 14/555,956

(22) Filed: Nov. 28, 2014

(65) Prior Publication Data
US 2016/0156276 A1    Jun. 2, 2016

(51) Int. Cl.
H02M 5/45    (2006.01)
H02M 5/44    (2006.01)
H02M 1/36    (2007.01)
H02M 7/483   (2007.01)

(52) U.S. Cl.
CPC .............. *H02M 5/44* (2013.01); *H02M 1/36* (2013.01); *H02M 7/483* (2013.01); *H02M 5/45* (2013.01); *H02M 2007/4835* (2013.01)

(58) Field of Classification Search
CPC ............ H02M 5/40; H02M 5/44; H02M 5/45; H02M 4/585; H02M 4/4585
See application file for complete search history.

(56) References Cited

U.S. PATENT DOCUMENTS

| 6,275,392 B1 * | 8/2001 | Streicher ................. H02M 1/10 307/80 |
| 7,042,180 B2 | 5/2006 | Terry et al. |
| 7,746,024 B2 | 6/2010 | Rozman et al. |

(Continued)

FOREIGN PATENT DOCUMENTS

| CN | 202261005 U | 5/2012 |
| EP | 1742342 A1  | 1/2007 |

OTHER PUBLICATIONS

Defay, F. et al., "A Predictive Control With Flying Capacitor Balancing of a Multicell Active Power Filter," IEEE Transactions on Industrial Electronics, vol. 55, No. 9, Sep. 2008 (pp. 3212-3220).

(Continued)

*Primary Examiner* — Matthew Nguyen
(74) *Attorney, Agent, or Firm* — Nitin N. Joshi

(57) ABSTRACT

An electrical circuit for a power converter includes a first switching device proximate an AC source. The circuit also includes a voltage measurement device proximate a DC link and extends between the AC source and the DC link. The circuit further includes a DC voltage source and a first capacitive device. The first capacitive device is positioned between the first switching device and the voltage measurement device. The circuit further includes a second switching device positioned between the first capacitive device and the voltage measurement device. The circuit also includes a controller operatively coupled to the DC voltage source, the voltage measurement device, and the switching devices. The controller is configured to open the second switching device when a measured voltage signal generated by the voltage measurement device is substantially representative of a reference voltage value.

15 Claims, 10 Drawing Sheets

(56) References Cited

U.S. PATENT DOCUMENTS

| | | | |
|---|---|---|---|
| 8,451,636 B2 | 5/2013 | Gruber et al. | |
| 8,503,203 B1 | 8/2013 | Szczeszynski et al. | |
| 8,816,631 B2 * | 8/2014 | Wei | H02P 27/06 |
| | | | 318/400.3 |
| 8,947,899 B2 * | 2/2015 | Savatski | H02M 5/4585 |
| | | | 174/68.2 |
| 2013/0119903 A1 | 5/2013 | Weiss et al. | |
| 2013/0121051 A1 | 5/2013 | Weiss et al. | |
| 2013/0264986 A1 * | 10/2013 | Niwa | H02P 31/00 |
| | | | 318/479 |
| 2013/0289911 A1 * | 10/2013 | Patel | H02M 5/4585 |
| | | | 702/65 |

OTHER PUBLICATIONS

Trabelsi, M. et al., "An Improved Predictive Control Approach for Multilevel Inverters," 2013 IEEE International Symposium on Sensorless Control for Electrical Drives and Predictive Control of Electrical Drives and Power Electronics (SLED/PRECEDE), Oct. 17-19, 2013, Munich (pp. 1-7).

Sepahvand, H. et al., "Capacitor Voltage Regulation and Pre-charge Routine for a Flying Capacitor Active Rectifier," 2012 IEEE Energy Conversion Congress and Exposition (ECCE), Sep. 15-20, 2012, Raleigh, NC (pp. 4107-4112).

\* cited by examiner

US 9,537,416 B2

SYSTEM AND METHOD FOR OPERATING POWER CONVERTERS

BACKGROUND

The field of the disclosure relates generally to electric power converter equipment and, more particularly, to a system and method for operation of multilevel converters.

Many known multilevel power converters are in use throughout various industries and for a variety of purposes for electric power conversion. Specifically, the term "multilevel converter" refers to a converter that can operate in an inverter mode and in a rectifier mode. One technical sector where known multilevel power converters are used is the medium voltage (MV) variable speed drive (VSD) industry, where MV VSDs are commonly deployed in many diverse processing facilities, e.g., industries such as the electric power generation industry. MV VSD's facilitate fast and precise process control with lower energy consumption, both results typically not attainable through devices such as constant speed drive motors.

Another technical sector where known multilevel power converters are used is the electric power transmission and distribution industry. At least some of the known electric power transmission and distribution facilities are physically positioned in a remote geographical region or in an area where physical access is difficult. One example includes electric power transmission and distribution facilities geographically located in rugged and/or remote terrain, for example, mountainous hillsides, extended distances from electric power grids, and submerged, e.g., off-shore oil and gas exploration and recovery installations. Many of these known electric power transmission and distribution facilities include a separated power conversion assembly, or system, electrically coupled to an alternating current (AC) power source, e.g., a utility power grid. Such known separated power conversion assemblies include a rectifier portion that converts the AC transmitted by the utility power generation grid to direct current (DC) and an inverter portion that converts the DC to AC of a predetermined frequency and voltage amplitude. The rectifier portion and the inverter portion use multilevel power converters that may shift between operating as a rectifier and operating as an inverter. Most known multilevel converters include semiconductor-based switching devices, e.g., thyristors, including insulated gate bipolar transistors (IGBTs). The rectifier and inverter portions are typically electrically coupled via a medium voltage DC (MVDC) or a high voltage DC (HVDC) link.

Various known multilevel converter topologies are in service or have been available for service. Many of the DC links for known multilevel converters include capacitors to facilitate levelizing DC voltage within the DC link to stabilize power transmission between the multilevel converters. These capacitors are referred to as "flying capacitors" herein. The voltages of the flying capacitors vary throughout operation of the associated multilevel converters as the operation of the switching devices in the converter vary. Also, the output voltage pattern and the blocking voltage of each switching device are determined by the flying capacitor voltages. In order to get the appropriate multilevel output with low harmonic distortion and prevent the devices from attaining overvoltage conditions, the flying capacitor voltages are maintained at or near certain voltage levels, which are normally defined as references, or reference voltages for the flying capacitors through all modes of operation of the multilevel converters, including startup. However, the voltage values of the flying capacitors prior to placing the multilevel converters in service is relatively low compared to the operating voltages, and may be as low as zero volts.

As such, the flying capacitor voltages are pre-charged to the references or near references first, before the multilevel converters start to switch. Otherwise, the service life of the switching devices may be shortened by exposure to overvoltage conditions. Traditionally, the pre-charge procedure requires a voltage sensor on each flying capacitor. As the ratings of the voltage levels associated with multilevel converter switching devices increases with the power ratings of the converters, the number of flying capacitors also increases appropriately. Therefore, more voltage sensors are needed which increases the costs of assembling and maintaining the multilevel converters and additional input channel resources associated with the controller further drives up cost.

BRIEF DESCRIPTION

In one aspect, an electrical circuit for a power convert is provided. The electrical circuit includes an electrically conductive element and a first switching device coupled to the electrically conductive element proximate an alternating current (AC) source. The electrical circuit also includes a voltage measurement device coupled to the electrically conductive element proximate a direct current (DC) link. The electrical circuit extends between the AC source and the DC link. The electrical circuit further includes a DC voltage source coupled to the electrically conductive element. The electrical circuit also includes a first capacitive device coupled to the electrically conductive element. The first capacitive device is positioned between the first switching device and the voltage measurement device. The electrical circuit further includes a second switching device coupled to the electrically conductive element. The second switching device is positioned between the first capacitive device and the voltage measurement device. The electrical circuit also includes a controller operatively coupled to the DC voltage source, the voltage measurement device, the first switching device, and the second switching device. The controller is configured to open the second switching device when a measured voltage signal generated by the voltage measurement device is substantially representative of a reference voltage value.

In a further aspect, a method of operating a power converter including an electrical circuit is provided. The electrical circuit includes a first potion proximate an alternating current (AC) source and a second portion proximate a direct current (DC) link. The method includes opening a first switching device proximate the first portion, thereby substantially electrically isolating the electrical circuit from the AC source. The method also includes inducing a DC voltage proximate the second portion and charging a first capacitive device to a first predetermined voltage value. The first capacitive device is positioned between the first switching device and a second switching device. The method further includes measuring the voltage proximate the second portion and opening the second switching device when the measured voltage induced at the second portion is substantially equal to a first reference voltage value.

In another aspect, an electric power system is provided. The electric power system includes an alternating current (AC) source, a direct current (DC) link, and a first power converter comprising an electrical circuit extending between the AC source and the DC link. The electrical circuit includes an electrically conductive element and a first switching device coupled to the electrically conductive element proximate the AC source. The electrical circuit also includes a voltage measurement device coupled to the electrically conductive element proximate the DC link. The electrical circuit extends between the AC source and the DC link. The electrical circuit further includes a DC voltage source coupled to the electrically conductive element and a first capacitive device coupled to the electrically conductive element. The first capacitive device is positioned between the first switching device and the voltage measurement device. The electrical circuit also includes a second switching device coupled to the electrically conductive element. The second switching device is positioned between the first capacitive device and the voltage measurement device. The electrical circuit further includes a controller operatively coupled to the DC voltage source, the voltage measurement device, the first switching device, and the second switching device. The controller is configured to open the second switching device when a measured voltage signal generated by the voltage measurement device is substantially representative of a reference voltage value.

DRAWINGS

These and other features, aspects, and advantages of the present disclosure will become better understood when the following detailed description is read with reference to the accompanying drawings in which like characters represent like parts throughout the drawings, wherein.

Figure 1:
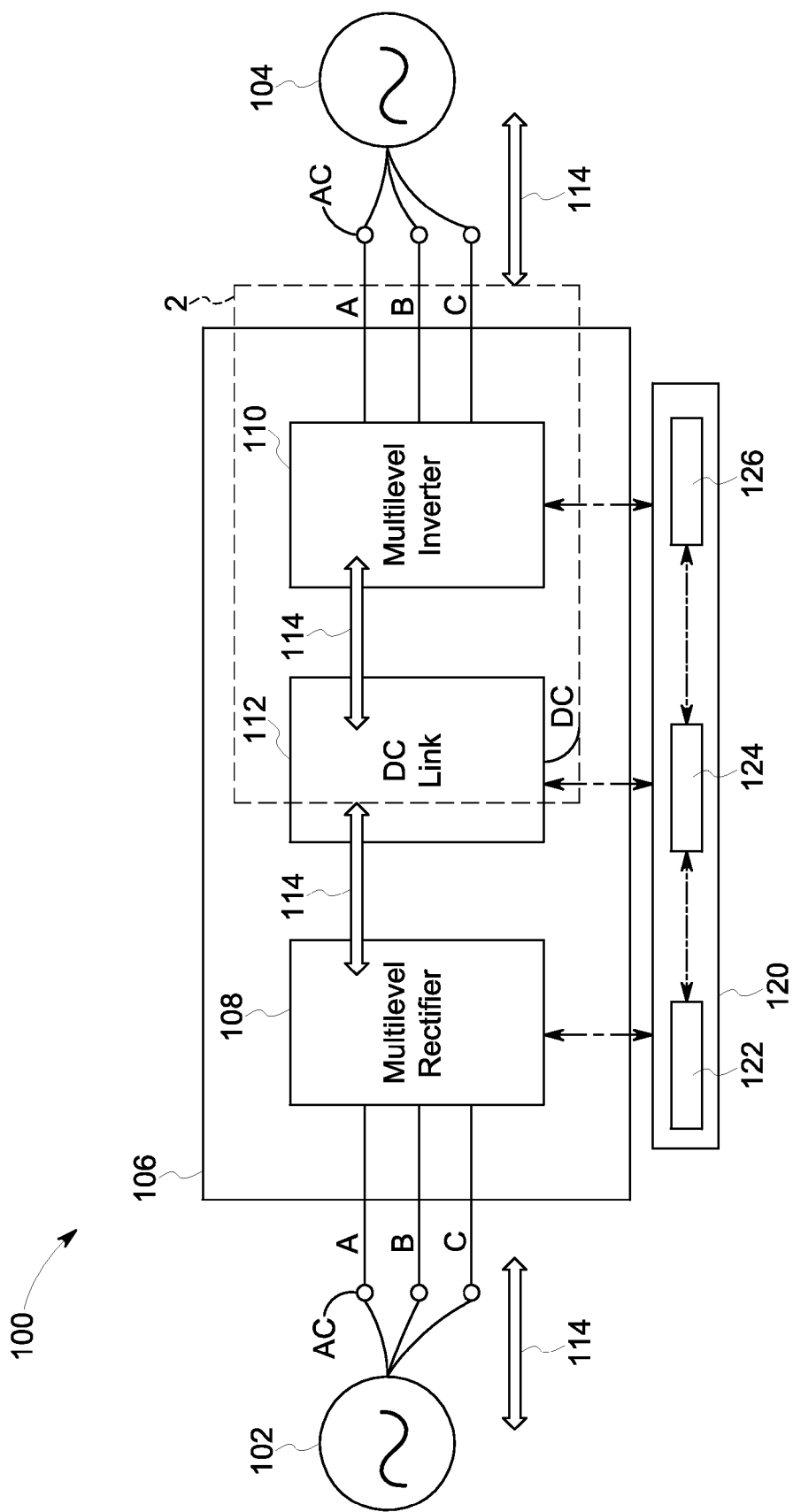
FIG. 1 is a schematic view of an exemplary electric power system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The multilevel power converters described herein provide for decreasing the number of voltage sensors required to monitor operation of flying capacitors during pre-charging operations when placing the associated multilevel converters in service. Also, as the exemplary embodiments in this disclosure indicate, the systems and methods described herein are not limited to any single multilevel converter topology. For example, the systems and methods disclosed herein may be used with multicell converter (MC) topologies, stacked multicell converter (SMC) topologies, active neutral point clamped (ANPC) converter topologies, and nested neutral point piloted (NPP) converter topologies. As such, the number of voltage sensors for the flying capacitors is decreased and the number of input/output (I/O) channels to the associated controllers is decreased, thereby decreasing the associated cabling and wiring. As such, configuration costs and associated processing resources are decreased. Therefore, the costs of assembling multilevel converters are decreased.

FIG. 1 is a schematic view of an exemplary electric power system 100. Electric power system 100 includes a first alternating current (AC) source 102, a second alternating current (AC) source 104, and a multilevel converter 106 coupled there between. In some alternative embodiments, AC source 104 is replaced with a load, or a system of loads. Multilevel converter 106 includes a multilevel rectifier 108, a multilevel inverter 110, and a direct current (DC) link 112 there between and coupled to rectifier 108 and inverter 110. In the exemplary embodiment, multilevel rectifier 108 and multilevel inverter 110 are substantially similar multilevel power converters and are configured to switch from rectification operation to inversion operation and the reverse. Therefore, electric power conversion between AC and DC and the associated electric power transmission is bi-directional as indicated by arrows 114. Multilevel rectifier 108, multilevel inverter 110, and DC link 112 are constructed with any components have any configured that enables operation of electric power system 100 and multilevel converter 106 as described herein. In the exemplary embodiment, electric power system 100 is a three-phase system with the A-phase, B-phase, and C-phase shown. Alternatively, electric power system 100 has any configuration that enables operation as described herein, including, and without limitation, single phase and multiphase (more phases or less phases than a three phase configuration).

Multilevel converter 106 also includes a controller 120. Controller 120 includes a memory device 122 and a processor 124 operatively coupled to memory device 122 for executing instructions. In some embodiments, executable instructions are stored in memory device 122. Controller 120 is configurable to perform one or more operations described herein by programming processor 124. For example, processor 124 may be programmed by encoding an operation as one or more executable instructions and providing the executable instructions in memory device 122. In the exemplary embodiment, memory device 122 is one or more devices that enable storage and retrieval of information such as executable instructions and/or other data. Memory device 122 may include one or more computer readable media. Memory device 122 may be configured to store operational measurements associated with electric power system 100 including, without limitation, real-time and historical voltage values, current values, and/or any other type data. Also, memory device 122 includes, without limitation, sufficient data, algorithms, and commands to facilitate operating multilevel converter 106 as described herein. In some embodiment, controller 120 includes a comparator circuit 126 (described further below).

Figure 2:
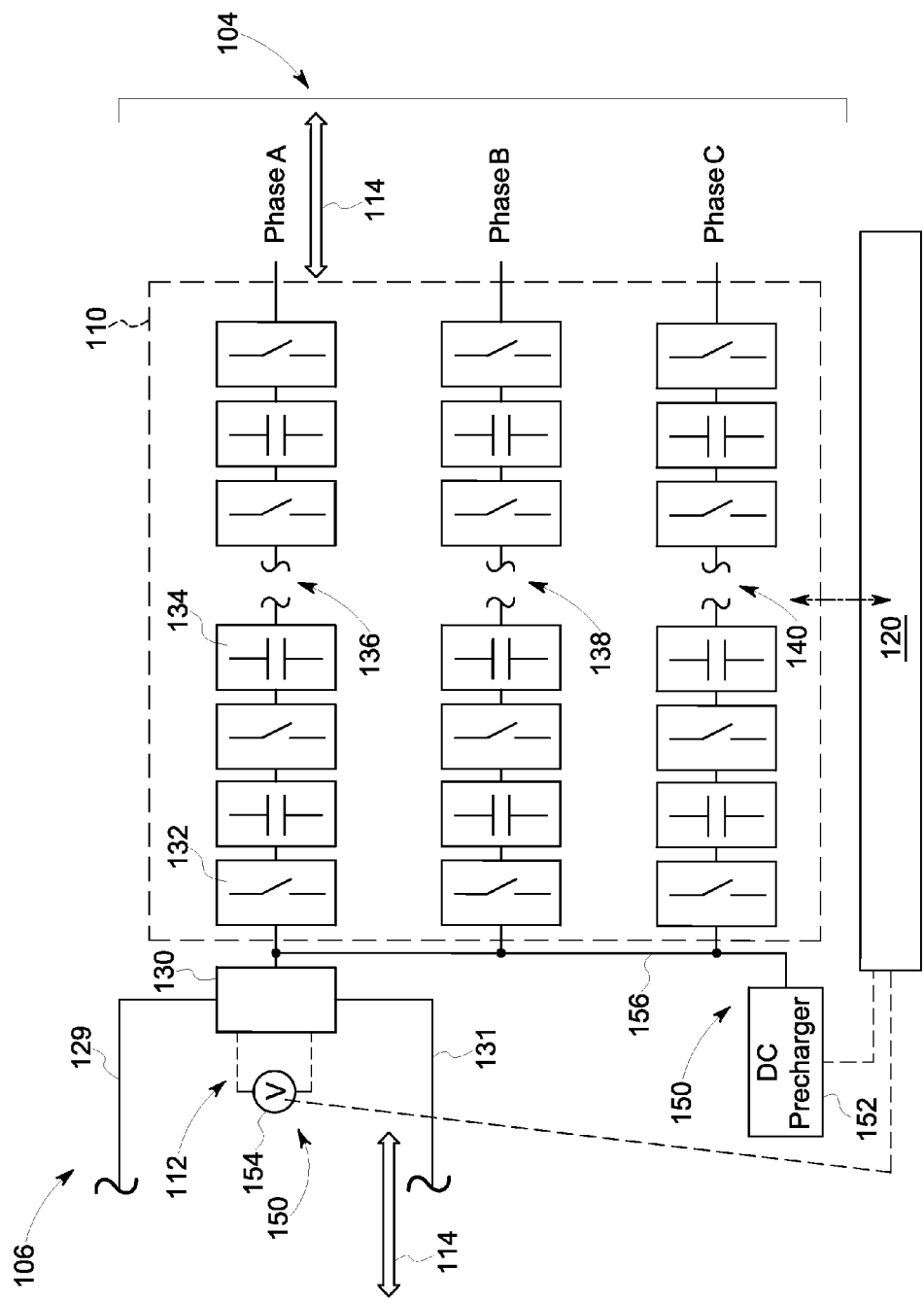
FIG. 2 is a schematic modular view of a portion of an exemplary multilevel power converter that may be used with the electric power system shown in FIG. 1.

FIG. 2 is a schematic modular view of a portion of multilevel power converter 106 that may be used with electric power system 100 (shown in FIG. 1) and taken at area 2 (shown in FIG. 1). Specifically, a portion of multilevel inverter 110 and a portion of DC link 112 are shown. DC link 112 includes a DC link device 130 that includes at least one of, without limitation, one or more capacitors in a capacitor bank and a battery device (neither shown). In the exemplary embodiment, DC link 112 also includes a positive DC rail 129 and a negative DC rail 131 in parallel with each other. Alternatively, DC link 112 includes any number of rails that enables operation of multilevel power converter 106 and electric power system 100 as described herein, including, without limitation, three rails, i.e., positive rail 129, negative rail 131, and a neutral rail (such configuration discussed further below).

Multilevel inverter 110 includes a plurality of switching devices, i.e., switcher cells 132 and a plurality of capacitive devices, i.e., capacitor cells 134. Switcher cells 132 include any number and any type of semiconductor-based switching devices, including, without limitation, insulated gate bipolar transistors (IGBTs). Capacitor cells 134 include flying capacitors. Switcher cells 132 and capacitor cells 134 are shown in a nested, i.e., in the exemplary embodiment, a series configuration for simplicity that defines three, substantially similar phase legs 136, 138, and 140 for the A-phase, B-phase, and C-phase, respectively. However, cells 132 and 134 have any configuration that enables operation of multilevel power converter 106, e.g., and without limitation, a nested configuration including parallel cells.

Multilevel power converter 106 also includes a flying capacitor pre-charging system 150 that includes a DC voltage device, i.e., a DC pre-charger 152 and a voltage measurement device 154. DC pre-charger 152 is coupled to phase legs 136, 138, and 140 through a plurality of electrically conductive elements 156. Therefore, DC pre-charger 152 is configured to energize and charge all flying capacitors in capacitor cells 134 for all three phase legs 136, 138, and 140, and DC link device 130 in DC link 112, substantially simultaneously. Voltage measurement device 154 is coupled to DC link device 130 in a configuration that facilitates measuring the total voltage across DC link device 130 extending between positive DC rail 129 and negative DC rail 131 in DC link 112. Voltage measurement device 154 is any instrument that enables operation of multilevel power converter 106 and flying capacitor pre-charging system 150 as described herein, including, without limitation, a voltage transducer. Flying capacitor pre-charging system 150 also includes at least a portion of controller 120.

Figure 3:
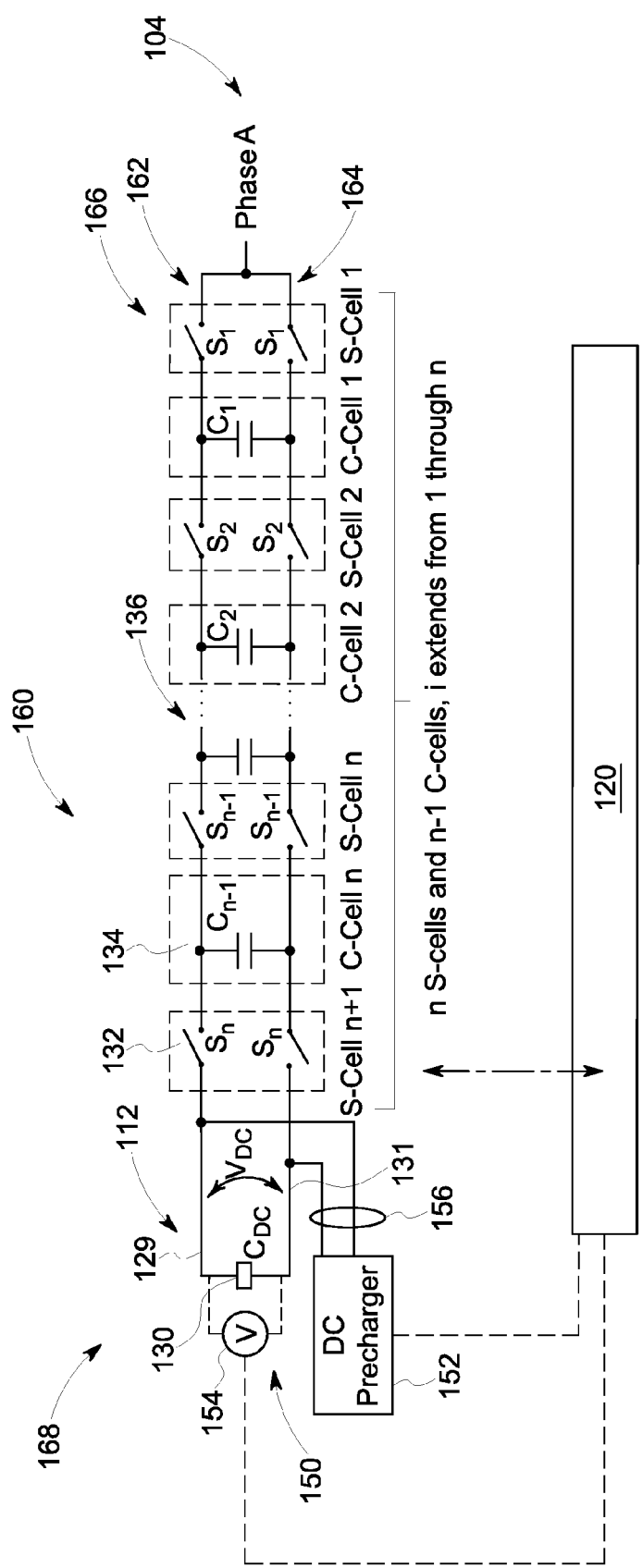
FIG. 3 is a schematic modular view of an exemplary electrical circuit including a phase leg and a DC link of the multilevel power converter shown in FIG. 2.

FIG. 3 is a schematic modular view of an electrical circuit 160 that includes phase leg 136 and DC link 112 with a multicell converter (MC) topology. Phase leg 136 and the portion of DC link 112 shown form electrical circuit 160. Phase legs 138 and 140 (both shown in FIG. 2) are substantially similar. Therefore the associated electrical circuits are also substantially similar. Electrical circuit 160 includes a first electrically conductive element 162 coupled to positive DC rail 129 and a second electrically conductive element 164 coupled to negative DC rail 131. First electrically conductive element 162 and second electrically conductive element 164 are parallel to each other, thereby defining a two-level circuit with first electrically conductive element 162 positively charged and second electrically conductive element 164 negatively charged.

Each switcher cell 132 (shown as "S-cell") is positioned along elements 162 and 164 to facilitate insolating an associated capacitor cell 134 (shown as "C-Cell") by opening and interrupting a portion of elements 162 and 164. In the exemplary embodiment, there are a total of "n" S-cells 132 and a total of "n−1" C-Cells 134, where n is a positive integer starting at 1. A first switching cell 132, i.e., S-Cell 1 (n=1) is positioned proximate, i.e., closest to the A-phase of second alternating current source 104 at a first portion 166 and is configured to isolate all components in phase leg 136 from source 104. S-Cell 1 is represented by two switches $S_1$. A second portion 168 of electrical circuit 160 is defined by DC link device 130.

Also, in the exemplary embodiment, a first capacitive cell 134, i.e., C-Cell 1 is positioned between S-Cell 1 and voltage measuring device 154 such that with S-Cell 1 in the open position, DC pre-charger 152 and the A-phase of source 104 are electrically isolated from each other. The remainder of S-Cells from 2 through n are closed, thereby they are controlled to be conducting. C-Cell 1 is represented by a capacitor $C_1$. Also, when C-Cell 1 is being charged by DC pre-charger 152, voltage measuring device 154 generates a voltage signal substantially representative of a voltage across charged C-Cell 1 and transmits the signal to controller 120. More specifically, voltage measuring device 154 generates a voltage signal substantially representative of a voltage across DC link device 130 that is representative of the voltage across charged C-Cell 1 as determined by controller 120 based on the known electrical properties of phase leg 136 between C-Cell 1 and voltage measurement device 154.

A second switching device, i.e., S-Cell 2 is positioned between C-Cell 1 and voltage measurement device 154 such that once C-Cell 1 is appropriately charged, i.e., attains a predetermined reference voltage, S-Cell 2 is configured to open to isolate C-Cell 1 from DC pre-charger 152. S-cell 2 is represented by a pair of switches $S_2$. Controller 120 generates the control signals to operate switching cells 132 as a function of signals received from voltage measurement device 154. C-Cell 2 is positioned between S-Cell 2 and an S-Cell 3. Such alternating and series positioning of S-Cells 132 and C-Cells 134 continues until S-Cell n+1 follows C-Cell n.

Figure 4:
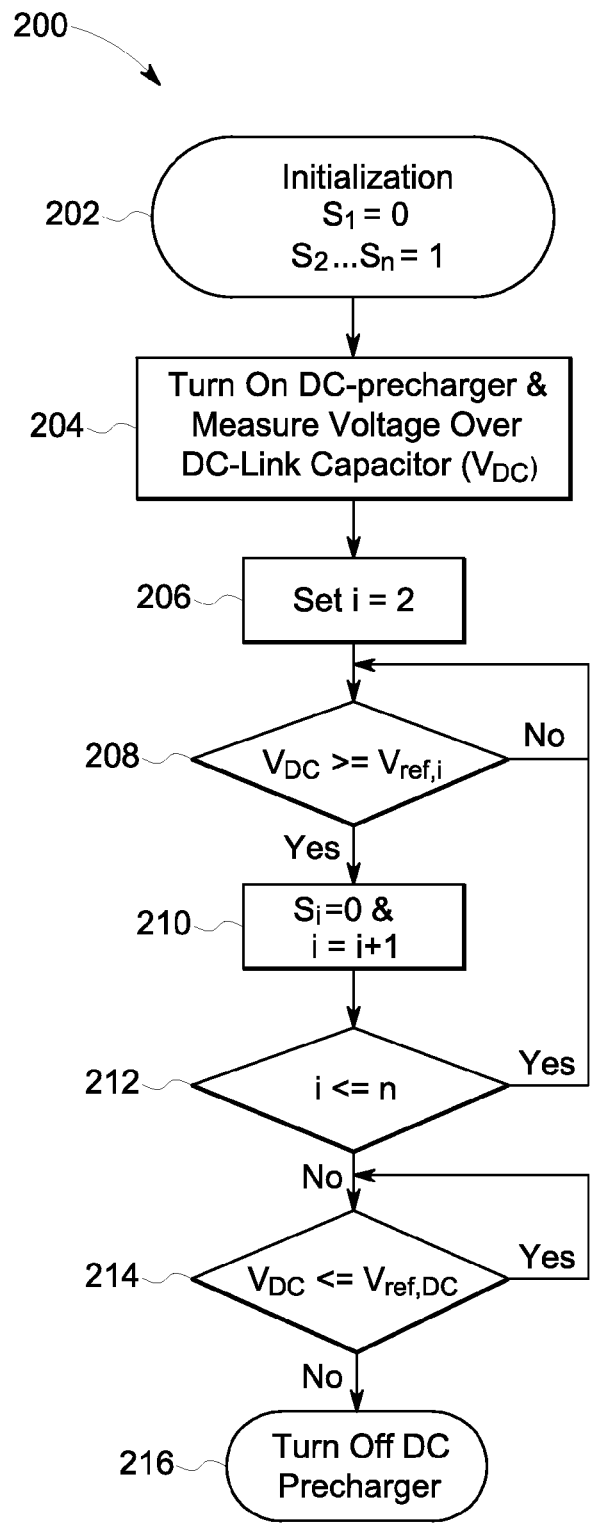
FIG. 4 is a flow chart of an exemplary method of operating the electrical circuit shown in FIG. 3.

FIG. 4 is a flow chart of an exemplary method 200 of operating electrical circuit 160, including phase leg 136, DC link device 130, and flying capacitor pre-charging system 150 (all shown in FIG. 3).

Referring to FIGS. 3 and 4, method 200 includes a first step of initialization 202 of flying capacitor pre-charging system 150. Initialization 202 includes setting switching device $S_1$ of S-Cell 1 to zero, i.e., turning off S-Cell 1 to a non-conducting state similar to an open circuit and setting switching devices $S_2$ of S-Cell 2 through switching devices $S_n$ of S-Cell n to one, i.e., a conducting state similar to a closed switch. Method 200 also includes energizing 204 DC pre-charger 150 and measuring the voltage across DC link device 130 by voltage measurement device 154, sending the voltage signal to controller 120, and determining the voltage across charged capacitive device $C_1$ of C-Cell 1 through controller 120. Method 200 further includes setting 206 i equal to 2 (i=2). Moreover, method 200 includes determining 208, though controller 120, that the pre-charge voltage across C-Cell 1 as measured across DC link device 130 by voltage measurement device 154 as described above, i.e., $V_{DC}$ is greater than or equal to the predetermined reference voltage for C-Cell 1, i.e., $V_{ref,i}$, where each capacitor cell 134 has a different reference voltage $V_{ref,i}$, i.e., $V_{DC} \geq V_{ref,i}$. If this condition is not met, controller 120 returns to method step 208 after a predetermined temporal period until the condition is met.

Once the condition described in method step 208 is attained, method 200 includes shifting 210 switching devices $S_2$ of S-Cell 2 from the conducting state (1) to the non-conducting state (0) (thereby electrically isolating C-Cell 1) and increasing i by one, i.e., i=i+1. Then, method 200 includes determining 212 i≤n. As long as i is less than n, the voltage comparison is made and S-Cells are opened sequentially moving from right to left until i=n. Once i=n, i.e., S-Cell n is open, method 200 proceeds to determining 214 $V_{DC} \leq V_{ref,DC}$, i.e., the reference voltage value for charged DC link device 130 for placing phase leg 136 into service by closing S-Cell 1. Such charging of device 130 by DC pre-charger 152 continues until the conditions of method step 214 are no longer met, i.e., $V_{ref,DC} > V_{DC}$. Once device 130 is fully charged, DC pre-charger 152 is de-energized 216.

Figure 5:
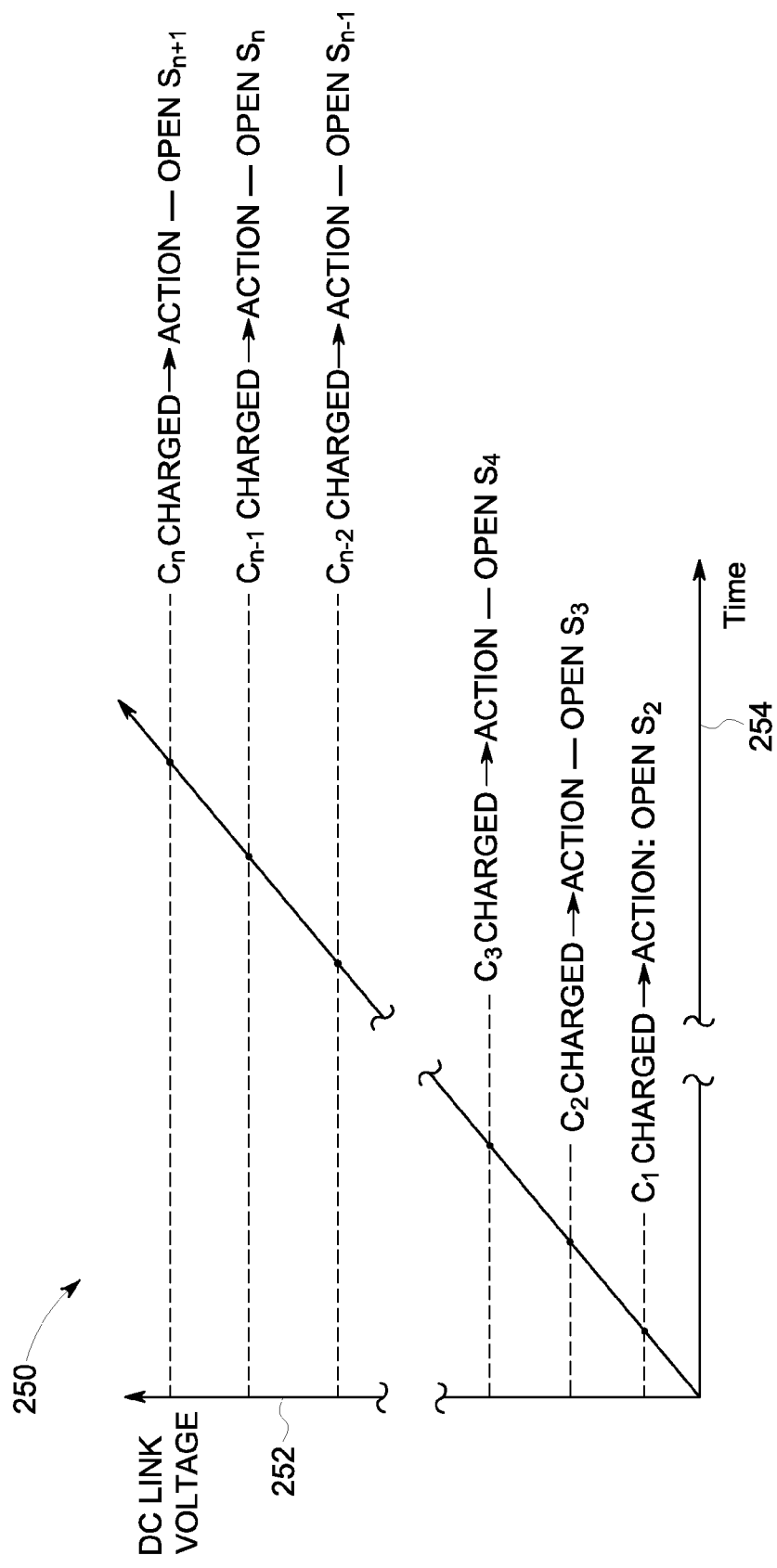
FIG. 5 is a graphical view of a change in the voltage of the DC link shown in FIG. 3 as a function of time as the method shown in FIG. 4 progresses.

FIG. 5 is a graphical view, i.e., graph 250 of the change in DC link voltage as a function of time as method 200 progresses. Graph 250 includes a y-axis 252 representative of the measured voltage on DC link 112 as measured by voltage measurement device 154 (both shown in FIG. 3), where y-axis 252 is unitless. Graph 250 also includes an x-axis 254 representative of time and x-axis 254 is unitless. As C-Cells 134 from i=1 to i=n are charged to the associated predetermined voltages, and as the measured voltage on DC link 112 as measured by voltage measurement device 154 steadily increases, associated switching devices S from i=1 through i=n+1 are shifted from the conducting state (1) to the non-conducting state (0).

Figure 6A:
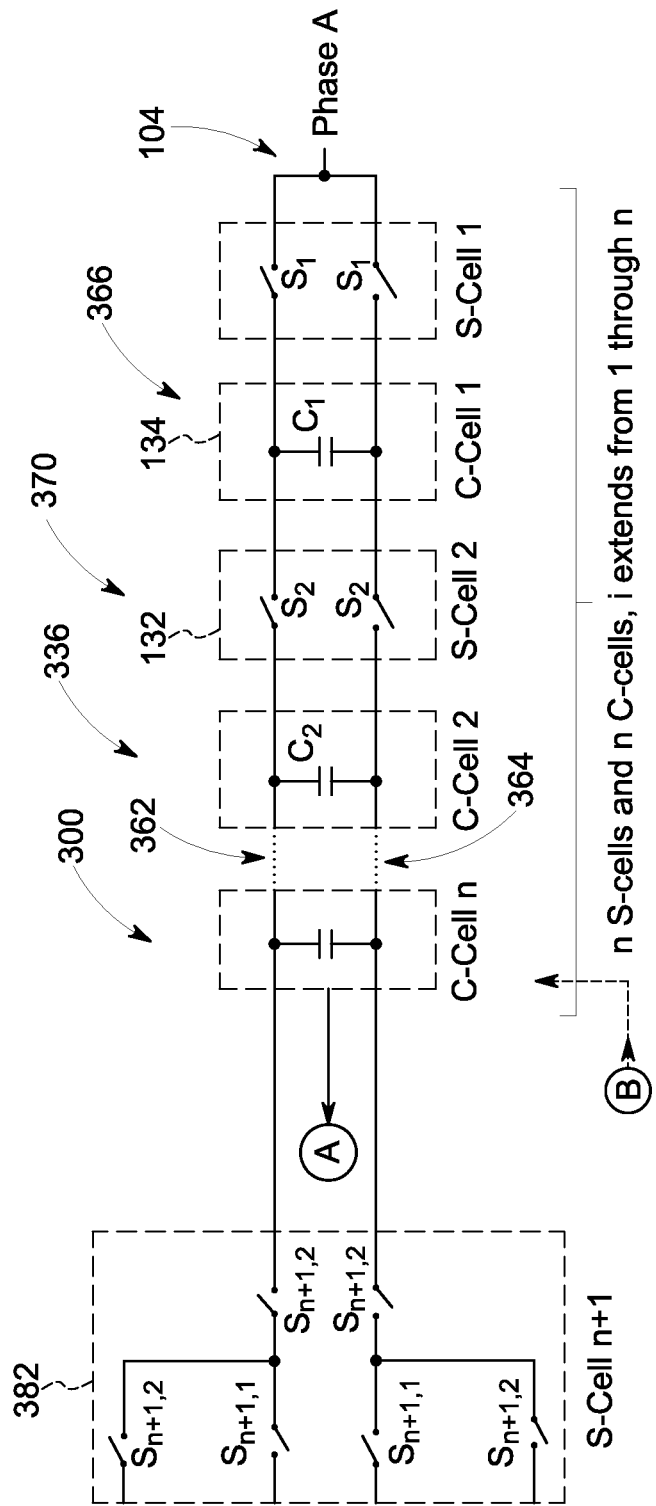
FIG. 6A is a schematic modular view of an alternative electrical circuit including a phase leg of the multilevel power converter shown in FIG. 2.
Figure 6B:
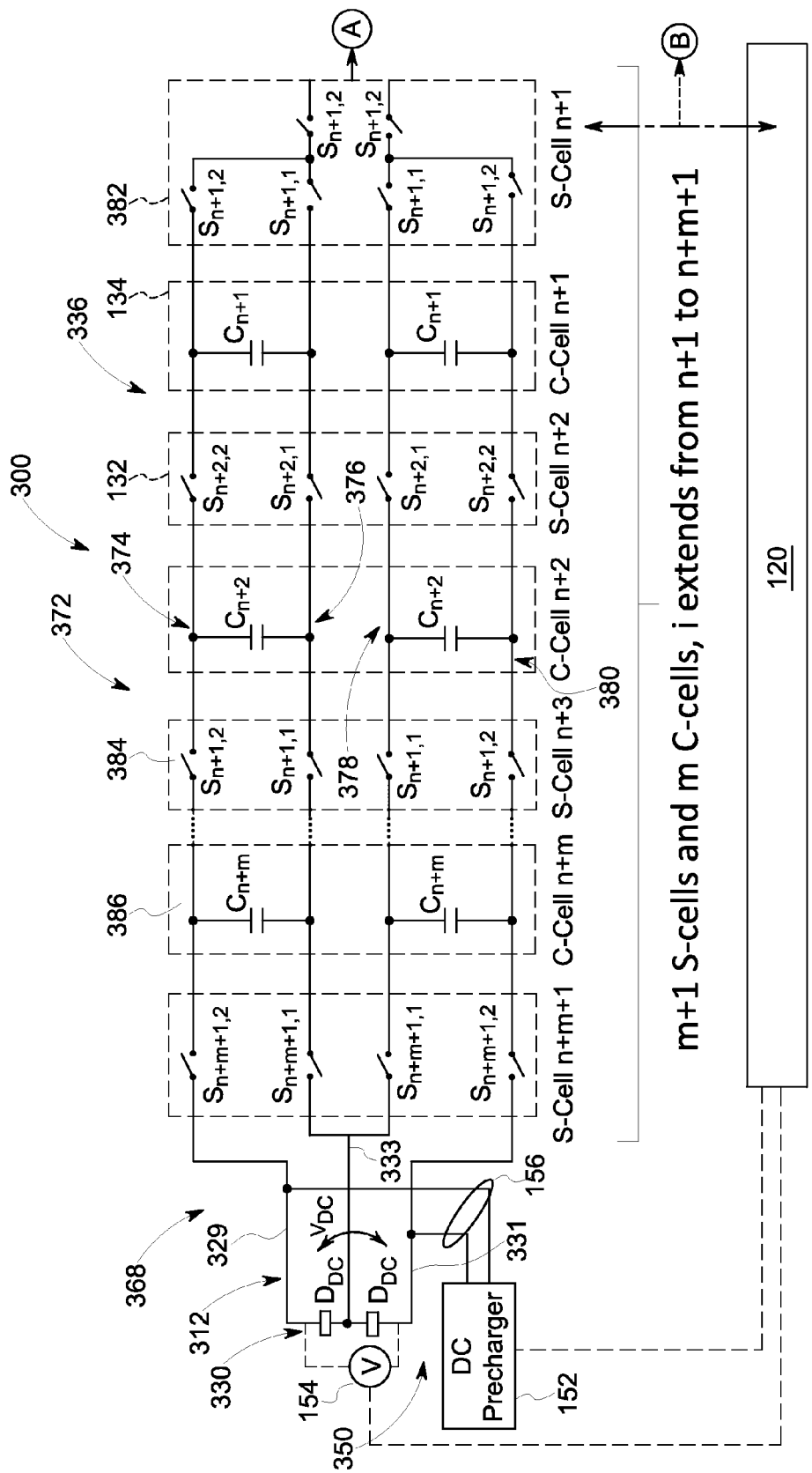
FIG. 6B is a continuation of FIG. 6A.

FIG. 6A is a schematic modular view of an alternative electrical circuit 300 including an alternative phase leg 336, with an active neutral point clamped converter (ANPC) topology, of multilevel power converter 106 (shown in FIG. 2) and an alternative flying capacitor pre-charging system 350. FIG. 6B is a continuation of FIG. 6B. Phase leg 336 and an alternative DC link 312 form electrical circuit 300. Other phase legs (not shown) are substantially similar. Therefore, the associated electrical circuits are also substantially similar. In addition to an alternative first portion 366 proximate the A-phase of second AC source 104 and an alternative second portion 368 proximate DC link device 130, electrical circuit 300 includes a first sub-circuit 370 and a second sub-circuit 372 coupled to first sub-circuit 370. First portion 366 is substantially similar to first portion 166 (shown in FIG. 3). Second portion 368 and DC link 312 include an alternative positive DC rail 329, an alternative negative DC rail 331, and a neutral DC rail 333. As such, DC link 312 and second portion 368 define a three-level system and DC link device 330 is shown as two substantially similar devices $D_{DC}$ with a total voltage difference of $V_{DC}$ across both $D_{DC}$s. A first device $D_{DC}$ extends between positive DC rail 329 and neutral DC rail 333 and a second device $D_{DC}$ extends between negative DC rail 331 and neutral DC rail 333. Alternatively, any number of devices $D_{DC}$ are used with DC link device 330.

First sub-circuit 370 is similar to phase leg 136 (shown in FIG. 3). First sub-circuit 370 includes a first electrically conductive element 362 and a second electrically conductive element 364. First electrically conductive element 362 and second electrically conductive element 364 are parallel to each other. Each switcher cell 132 (shown as "S-cell") is positioned along elements 362 and 364 to facilitate insolating an associated capacitor cell 134 (shown as "C-Cell") by opening and interrupting a portion of elements 362 and 364. In the exemplary embodiment, there are a total of "n" S-cells 132 and a total of "n" C-Cells 134, where n is a positive integer starting at 1. A first switching cell 132, i.e., S-Cell 1 (n=1) is positioned proximate, i.e., closest to the A-phase of second alternating current source 104 at first portion 366 and is configured to isolate all components in phase leg 336 from source 104. One distinguishing feature is that after C-Cell n, first sub-circuit 370 does not include S-Cell n+1. However, S-Cell n+1 is positioned within second sub-circuit 372.

Second sub-circuit 372 is a three-level circuit, in contrast to first sub-circuit 370 that is a two-level circuit. Second sub-circuit includes four electrically conductive elements, i.e., third electrically conductive element 374, fourth electrically conductive element 376, fifth electrically conductive element 378, sixth electrically conductive element 380. In the exemplary embodiment, third electrically conductive element 374 is positively coupled, sixth electrically conductive element 380 is negatively coupled, and fourth and fifth electrically conductive elements 376 and 378, respectively, are neutrally coupled. Moreover, third electrically conductive element 374 is coupled to positive DC rail 329, sixth electrically conductive element 380 is coupled to negative DC rail 331, and fourth and fifth electrically conductive elements 376 and 378, respectively, are coupled to neutral DC rail 333. Furthermore, third electrically conductive element 374, fourth electrically conductive element 376, fifth electrically conductive element 378, sixth electrically conductive element 380 are parallel to each other.

Also, in the exemplary embodiment, a switcher cell 382, i.e., S-cell n+1 is positioned adjacent C-Cell n. Switcher cell 382 is shown in both FIGS. 6A and 6B for providing reference. S-Cell n+1 includes switching device $S_{n+1,2}$ positioned adjacent C-Cell n such that switching device $S_{n+1,2}$ is configured to electrically isolate first sub-circuit 370 from second sub-circuit 372 when opened. The second subscript includes a 2 that indicates the associated switching devices are not neutral, where a 1 indicates that they are neutral. S-Cell n+1 also includes two $S_{n+1,2}$ switching devices coupled to third and sixth electrically conductive elements 374 and 380, respectively. S-Cell n+1 further includes two $S_{n+1,1}$ switching devices coupled to fourth and fifth electrically conductive elements 376 and 378, respectively.

Further, in the exemplary embodiment, a capacitive cell 384, i.e., C-Cell n+1 is positioned between S-Cell n+1 and voltage measuring device 154 such that with S-Cell n+1 in the open position, DC pre-charger 152 and the A-phase of source 104 are electrically isolated from each other. In the exemplary embodiment, voltage measuring device 154 extends between positive DC rail 329 and negative DC rail 331. Alternatively, a plurality of voltage measuring devices 154 are used to measure the voltage across the plurality of $D_{DC}$s, where the voltage measurements are summed in controller 120. C-Cell 1 is represented by two capacitors $C_{n+1}$, where a first capacitor $C_{n+1}$ extends between third and fourth elements 382 and 384, respectively. Similarly, a second capacitor $C_{n+1}$ extends between fifth and sixth elements 386 and 388, respectively. A switching device 386, i.e., S-Cell n+2 is positioned between C-Cell n+1 and voltage measurement device 154 such that once C-Cell n+1 is appropriately charged, i.e., attains a predetermined reference voltage, S-Cell n+2 is configured to open to isolate C-Cell n+1 from DC pre-charger 152. S-cell 2 is represented by switches $S_{n+2,2}$ and $S_{n+2,1}$ in a manner similar to switching devices $S_{n+1,2}$ and switching devices $S_{n+1,1}$ associated with S-Cell n+1. Controller 120 generates the control signals to operate switching cells 382 and 386 as a function of signals received from voltage measurement device 154. A C-Cell n+2 is positioned between S-Cell n+2 and an S-Cell n+3. Such alternating and series positioning of S-Cells 386 and C-Cells 384 continues until S-Cell n+m+1 follows C-Cell n+m.

Figure 7:
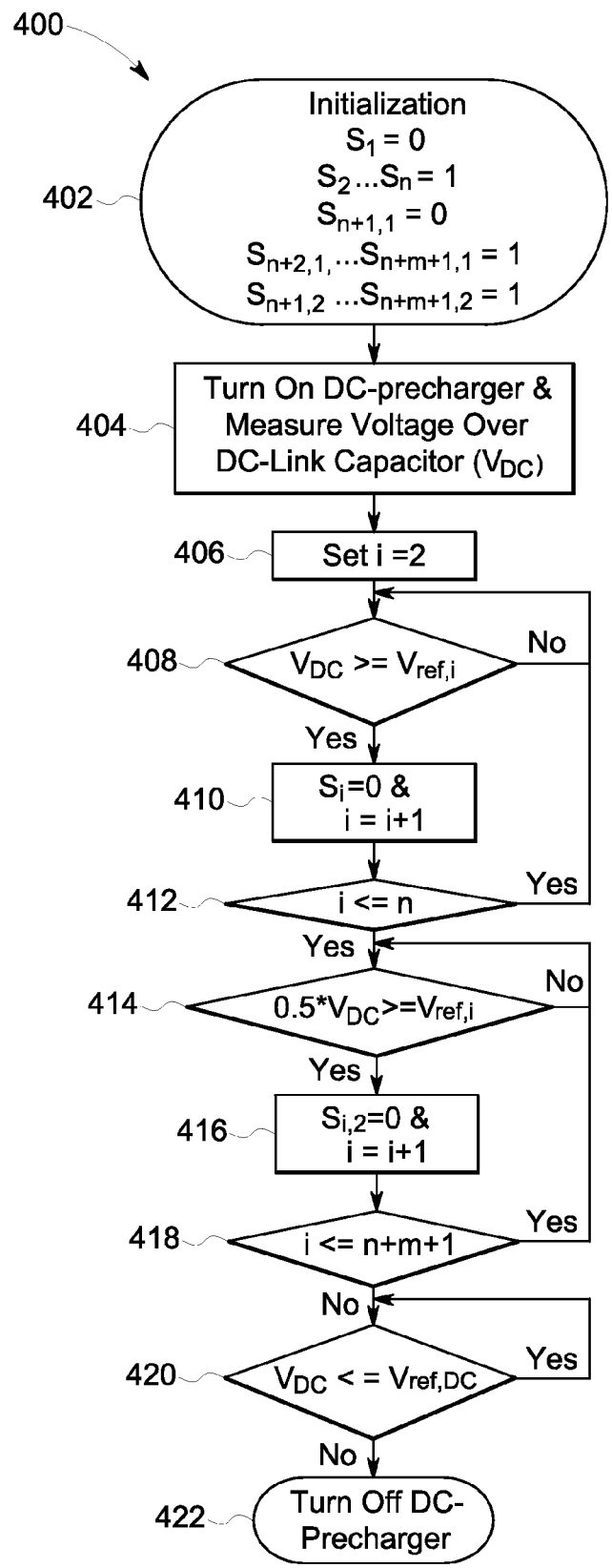
FIG. 7 is a flow chart of an exemplary method of operating the electrical circuit shown in FIGS. 6A and 6B.

FIG. 7 is a flow chart of an exemplary method 400 of operating electrical circuit 300, including phase leg 336, DC link device 330, and flying capacitor pre-charging system 350 (all shown in FIG. 6B). Referring to FIGS. 6A, 6B, and 7, method 400 includes a first step of initialization 402 of flying capacitor pre-charging system 350. Initialization 402 includes setting switching devices $S_1$ in S-Cell 1 of first sub-circuit 370 to zero, i.e., turning off S-Cell 1 to a non-conducting state similar to an open circuit. Similarly, switching devices $S_{n+1,1}$ in S-Cell n+1 of second sub-circuit 372 are opened. Also, switching devices $S_2$ of S-Cell 2 through switching devices $S_1$, in S-Cell n (not shown) of first sub-circuit 370 are set to one, i.e., a conducting state similar to a closed switch. Similarly, switching devices $S_{n+1,2}$ of S-Cell n+1 through switching devices $S_{n+m+1,2}$ of S-Cell n+m+1 of second sub-circuit 372 are closed. Further, similarly, switching devices $S_{n+2,1}$ of S-Cell n+2 through switching devices $S_{n+m+1,1}$ of S-Cell n+m+1 of second sub-circuit 372 are closed.

Method 400 also includes energizing 404 DC pre-charger 150 and measuring the voltage across DC link device 330 by voltage measurement device 154, sending the voltage signal to controller 120, and determining the voltage across charged C-Cell 1 through controller 120. Method 400 further includes setting 406 i equal to 2 (i=2). Moreover, method 400 includes determining 408, though controller 120, $V_{DC} \geq V_{ref,i}$. Determining 408 includes making a determination that the pre-charge voltage across C-Cell 1, i.e., $V_{DC}$ as measured across DC link device 330 by voltage measurement device 154 as described above, is greater than or equal to the predetermined reference voltage for C-Cell 1, i.e., $V_{ref,1}$, where each capacitor cell 134 has a different reference voltage $V_{ref,i}$. If this condition is not met, controller 120 returns to method step 408 after a predetermined temporal period until the condition is met.

Once the condition described in method step 408 is attained, method 400 includes shifting 410 S-Cell 2 from the conducting state (1) to the non-conducting state (0) (thereby electrically isolating C-Cell 1) and increasing i by one, i.e., i=i+1. Then, method 400 includes determining 412 i≤n. As long as i is less than n, the voltage comparison is made and S-Cells are opened sequentially moving from right to left until i=n. Once i=n, i.e., S-Cell n is open, method 400 returns to method step 410 and generates i=i+1 such that when i is increased to n+1, the requirements of method step 410 are no longer met. However, all four switching devices $S_{n+1,1}$ of S-Cell n+1 (as shown in FIGS. 6A and 6B) are opened, thereby electrically isolating C-Cell n with the predetermined pre-charge. Switching devices $S_{n=1,1}$ were opening in method step 402 above. As such, at this point in method 400, all C-Cells in first sub-circuit 370 are charged and electrically isolated, and method 400 proceeds to isolate the C-Cells in second sub-circuit 372.

Method 400 further includes determining 414, through controller 120, $0.5*V_{DC} \geq V_{ref,i}$. Determining 414 includes making a determination that the pre-charge voltage across each of capacitive devices $C_{n+1}$ in C-Cell n+1, i.e., $0.5*V_{DC}$ as measured across DC link device 330 by voltage measurement device 154 as described above, is greater than or equal to the predetermined reference voltage for C-Cell n+1, i.e., $V_{ref,n+1}$. If this condition is not met, controller 120 returns to method step 414 after a predetermined temporal period until the condition is met.

Once the condition described in method step 414 is attained, method 400 includes shifting 416 S-Cell n+2 from the conducting state (1) to the non-conducting state (0) (thereby electrically isolating C-Cell n+1) and increasing i by one, i.e., i=i+1. Then, method 400 includes determining 418 i≤n+m+1. As long as i is less than n+m+1, the voltage comparison is made and S-Cells are opened sequentially moving from right to left until i=n+m+1. Once i=n+m+1, i.e., S-Cell n+m+1 is open, method 400 returns to method step 410 and generates i=i+1 such that when i is increased to n+m+2, the requirements of method step 418 are no longer met. As such, at this point in method 400, all C-Cells in second sub-circuit 372 are charged and electrically isolated and method 400 proceeds to determining 420 $V_{DC} \leq V_{ref,DC}$, i.e., the reference voltage value for charged DC link device 330 for placing phase leg 336 into service by closing S-Cell 1. Such charging of device 330 by DC pre-charger 152 continues until the conditions of method step 420 are no longer met, i.e., $V_{ref,DC} > V_{DC}$. Once device 330 is fully charged, DC pre-charger 152 is de-energized 422.

Figure 8:
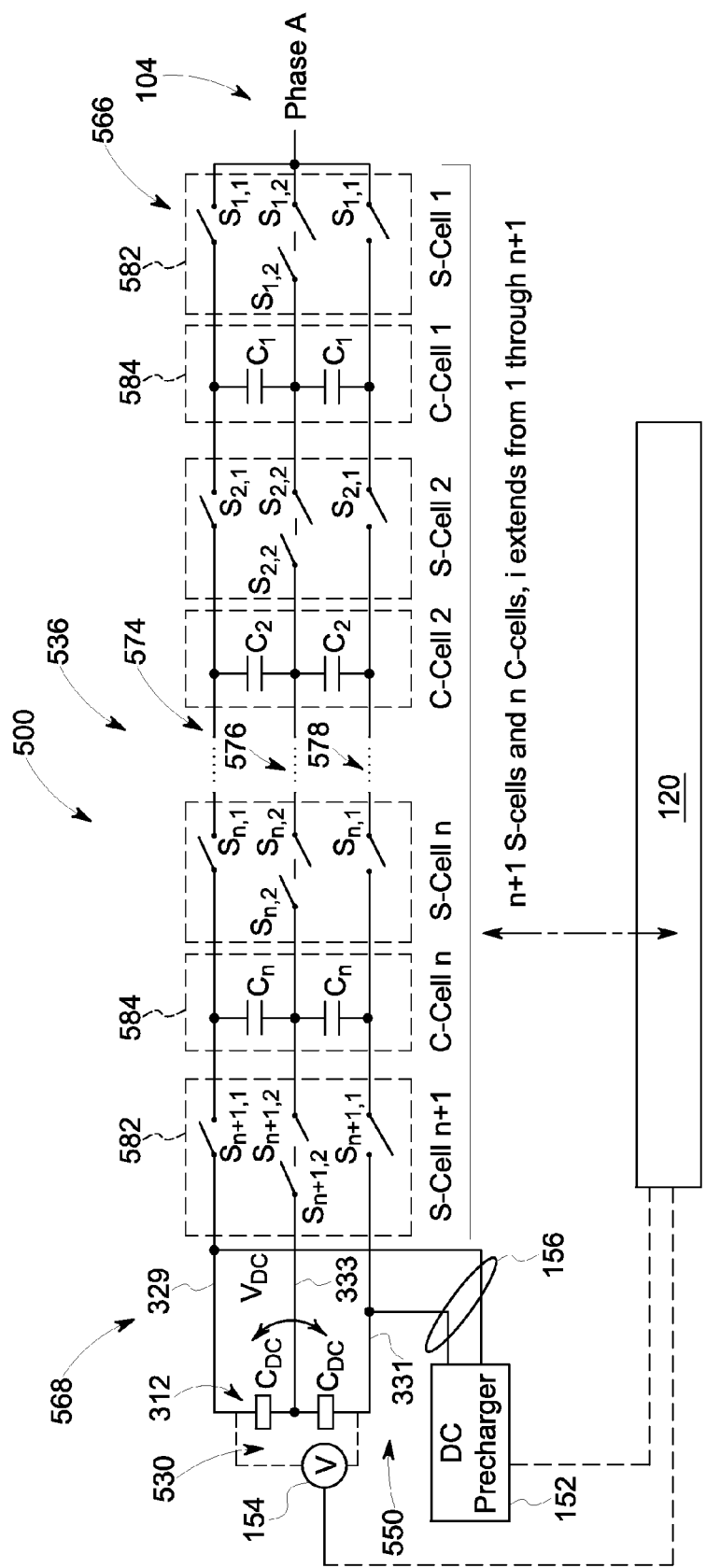
FIG. 8 is a schematic modular view of another alternative electrical circuit including a phase leg of the multilevel power converter shown in FIG. 2.

FIG. 8 is a schematic modular view of another alternative electrical circuit 500 including an alternative phase leg 536, with a nested neutral point piloted (NPP) topology, of multilevel power converter 106 (shown in FIG. 2) and an alternative flying capacitor pre-charging system 550. Phase leg 536 and DC link 312 form electrical circuit 500. Other phase legs (not shown) are substantially similar. Therefore, the associated electrical circuits are also substantially similar. Electrical circuit 500 includes an alternative first portion 566 proximate the A-phase of second AC source 104 and an alternative second portion 568 proximate DC link device 130. Electrical circuit 500 is a three-level circuit and includes three electrically conductive elements, i.e., first electrically conductive element 574, second electrically conductive element 576, and third electrically conductive element 578. In the exemplary embodiment, first electrically conductive element 574 is positively charged, third electrically conductive element 578 is negatively charged, and second electrically conductive element 576 is neutral. Moreover, first electrically conductive element 574 is coupled to positive DC rail 329, third electrically conductive element 578 is coupled to negative DC rail 331, and second electrically conductive elements 576 is coupled to neutral DC rail 333. Furthermore, first electrically conductive element 574, second electrically conductive element 576, and third electrically conductive element 578 are parallel to each other.

In the exemplary embodiment, electrical circuit 500 also includes a plurality of substantially similar switcher cells 582 (shown as "S-Cell") and a plurality of substantially similar capacitor cells 584 (shown as "C-Cell"). Each switcher cell 582 is positioned along elements 574, 576, and 578 to facilitate insolating an associated capacitor cell 584 by opening and interrupting a portion of elements 574, 576, and 578. In the exemplary embodiment, there are a total of "n+1" S-cells 582 and a total of "n" C-Cells 584, where n is a positive integer starting at 1. A first switching cell 582, i.e., S-Cell 1 (n=1) is positioned proximate, i.e., closest to the A-phase of second alternating current source 104 at first portion 566 and is configured to isolate all components in phase leg 536 from source 104.

Also, in the exemplary embodiment, each switcher cell 582 includes a switching device $S_{i,1}$ coupled to first element 574, a switching device $S_{i,1}$ coupled to third element 578, and a pair of series switching devices $S_{i,2}$ coupled to second element 576. The second subscript includes a 2 that indicates the associated switching devices are neutral, where a 1 indicates that they are not neutral. A first switching cell 582, i.e., S-Cell 1 (n=1) is positioned proximate, i.e., closest to the A-phase of second alternating current source 104 at first portion 566 and is configured to isolate all components in phase leg 536 from source 104.

Further, in the exemplary embodiment, a first capacitive cell 584, i.e., C-Cell 1 is positioned between S-Cell 1 and voltage measuring device 154 such that with S-Cell 1 in the open position, DC pre-charger 152 and the A-phase of source 104 are electrically isolated from each other. C-Cell 1 is represented by two capacitors $C_1$, where a first capacitor $C_1$ extends between first and second elements 574 and 576, respectively. Similarly, a second capacitor $C_1$ extends between second and third elements 576 and 578, respectively. A second switching device 586, i.e., S-Cell 2 is positioned between C-Cell 1 and voltage measurement device 154 such that once C-Cell 1 is appropriately charged, i.e., attains a predetermined reference voltage, S-Cell 2 is configured to open to isolate C-Cell 1 from DC pre-charger 152. Such alternating and series positioning of S-Cells 582 and C-Cells 584 continues until S-Cell n+1 follows C-Cell n. Controller 120 generates the control signals to operate switching cells 582 as a function of signals received from voltage measurement device 154.

Figure 9:
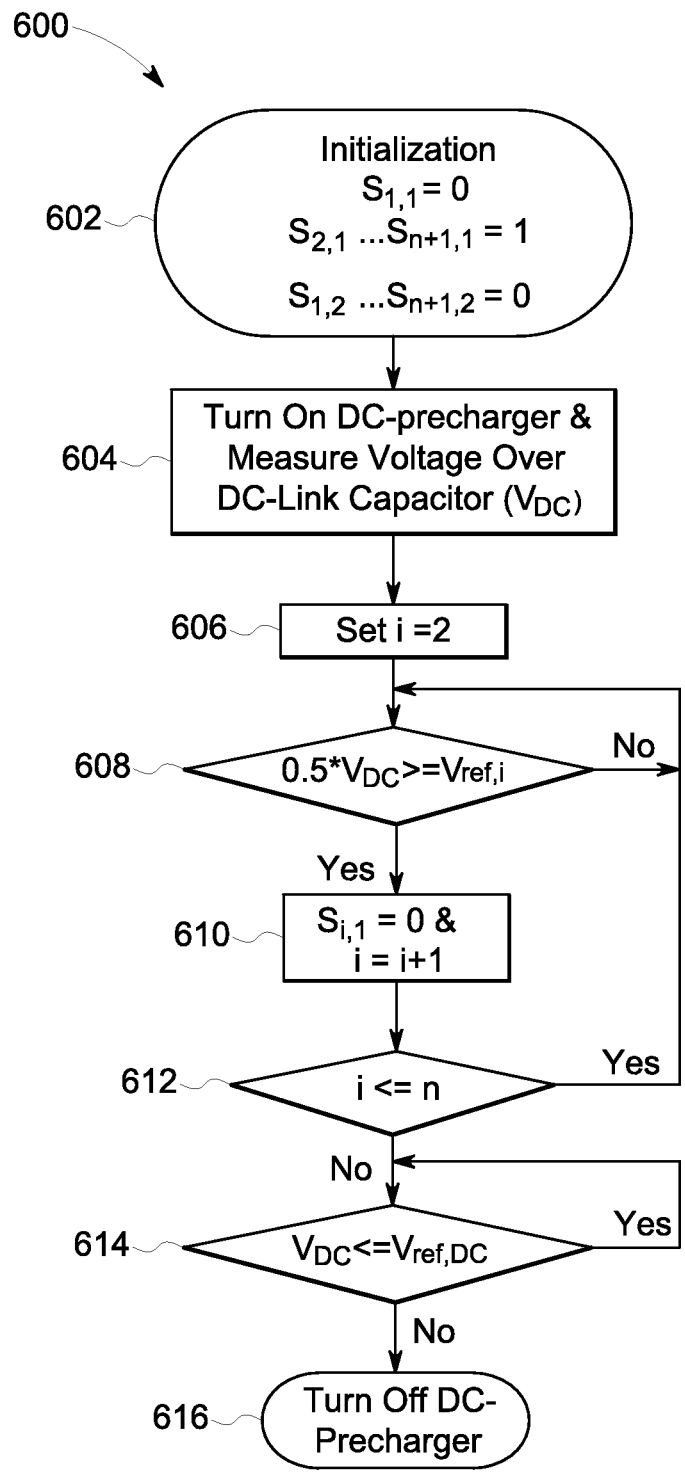
FIG. 9 is a flow chart of an exemplary method of operating the electrical circuit shown in FIG. 8.

FIG. 9 is a flow chart of an exemplary method 600 of operating electrical circuit 500, including phase leg 536, DC link device 530, and flying capacitor pre-charging system 550 (all shown in FIG. 8). Referring to FIGS. 8 and 9, method 600 includes a first step of initialization 602 of flying capacitor pre-charging system 550. Initialization 602 includes setting switching devices $S_{1,1}$ and $S_{1,2}$ in S-Cell 1 to zero, i.e., turning off S-Cell 1 to a non-conducting state similar to an open circuit. Also, switching devices $S_{2,1}$ of S-Cell 2 through switching devices $S_{n+1,1}$ in S-Cell n+1 are set to one, i.e., a conducting state similar to a closed switch. Further, switching devices $S_{2,2}$ of S-Cell 2 through switching devices $S_{n+1,2}$ in S-Cell n+1 are set to zero.

Method 600 also includes energizing 604 DC pre-charger 150 and measuring the voltage across DC link device 530 by voltage measurement device 154, sending the voltage signal to controller 120, and determining the voltage across charged C-Cell 1 through controller 120. Method 600 further includes setting 606 i equal to 2 (i=2). Moreover, method 600 further includes determining 608, though controller 120, $0.5*V_{DC} \geq V_{ref,i}$. If this condition is not met, controller 120 returns to method step 608 after a predetermined temporal period until the condition is met.

Once the condition described in method step 608 is attained, method 600 includes shifting 610 S-Cell 2 from the conducting state (1) to the non-conducting state (0) (thereby electrically isolating C-Cell 1) and increasing i by one, i.e., i=i+1. Then, method 600 includes determining 612 i≤n. As long as i is less than n, the voltage comparison is made and S-Cells are opened sequentially moving from right to left until i=n+1. Once i=n+1, i.e., S-Cell n+1 is open, method 600 returns to method step 610 and generates i=i+1 such that when i is increased to n+2, the requirements of method step 610 are no longer met. As such, at this point in method 600, all C-Cells in phase leg 536 are charged and electrically isolated and method 600 proceeds to determining 614 $V_{DC} \leq V_{ref,DC}$, i.e., the reference voltage value for charged DC link device 530 for placing phase leg 536 into service by closing S-Cell n+1. Such charging of device 530 by DC pre-charger 152 continues until the conditions of method step 614 are no longer met, i.e., $V_{ref,DC} > V_{DC}$. Once device 530 is fully charged, DC pre-charger 152 is de-energized 616.

The above-described multilevel power converters provide for decreasing the number of voltage sensors required to monitor operation of flying capacitors during pre-charging operations when placing the associated multilevel converters in service. Also, as the exemplary embodiments in this disclosure indicate, the systems and methods described herein are not limited to any single multilevel converter topology. For example, the systems and methods disclosed herein may be used with multicell converter (MC) topologies, stacked multicell converter (SMC) topologies, active neutral point clamped (ANPC) converter topologies, and nested neutral point piloted (NPP) converter topologies. As such, the number of voltage sensors for the flying capacitors is decreased and the number of input/output (I/O) channels to the associated controllers is decreased, thereby decreasing the associated cabling and wiring. As such, configuration costs and associated processing resources are decreased. Therefore, the costs of assembling multilevel converters are decreased.

An exemplary technical effect of the methods, systems, and apparatus described herein includes at least one of: (a) decreasing the number of voltage sensors used in multilevel converters; (b) sequentially pre-charging and then electrically isolating flying capacitors in each phase leg of multilevel converters to a predetermined voltage level using a voltage measurement device across a DC link as the sole voltage indication for each flying capacitor; (c) decreasing the number of I/O channels and the associated cabling and controller configuration efforts; and (d) decreasing the number of components that require preventive and corrective maintenance.

Exemplary embodiments of methods, systems, and apparatus for operating electric power conversion systems are not limited to the specific embodiments described herein, but rather, components of systems and/or steps of the methods may be utilized independently and separately from other components and/or steps described herein. For example, the methods, systems, and apparatus may also be used in combination with other systems requiring pre-charging operations prior to power converters being placed into service, and the associated methods, and are not limited to practice with only the systems and methods as described herein. Rather, the exemplary embodiment can be implemented and utilized in connection with many other applications, equipment, and systems that may benefit from pre-charging capacitors without voltage measurement devices for each capacitor, e.g., and without exception, variable speed drives (VSDs).

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical circuit for a power converter, said electrical circuit comprising:
   an electrically conductive element;
   a first switching device coupled to said electrically conductive element proximate an alternating current (AC) source;
   a voltage measurement device coupled to said electrically conductive element proximate a direct current (DC) link, wherein said electrical circuit extends between the AC source and the DC link;
   a DC voltage source coupled to said electrically conductive element;
   a first capacitive device coupled to said electrically conductive element, said first capacitive device positioned between said first switching device and said voltage measurement device;
   a second switching device coupled to said electrically conductive element, said second switching device positioned between said first capacitive device and said voltage measurement device; and
   a controller operatively coupled to said DC voltage source, said voltage measurement device, said first switching device, and said second switching device, said controller configured to open said second switching device when a measured voltage signal generated by said voltage measurement device is substantially representative of a reference voltage value.

2. The electrical circuit in accordance with claim 1, wherein said electrically conductive element comprises a first electrically conductive element coupled to at least a positive DC rail and a second electrically conductive element coupled to at least a negative DC rail, said voltage measurement device configured to measure the voltage across at least one DC link device extending between said positive DC rail and said negative DC rail.

3. The electrical circuit in accordance with claim 1, wherein said first switching device is configured to isolate said electrical circuit from the AC source.

4. The electrical circuit in accordance with claim 1, wherein said DC voltage source is a DC pre-charger configured to energize said electrical circuit with a predetermined voltage value.

5. The electrical circuit in accordance with claim 1 further comprising:
- a second capacitive device coupled to said electrically conductive element; and
- a third switching device coupled to said electrically conductive element, said second capacitive device positioned between said second switching device and said third switching device, and said third switching device positioned between said second capacitive device and said voltage measurement device.

6. The electrical circuit in accordance with claim 5, wherein said first capacitive device, said second switching device, said second capacitive device, and said third switching device define a plurality of said switching devices and a plurality of said capacitive devices alternating is a nested configuration.

7. The electrical circuit in accordance with claim 6, wherein said plurality of said switching devices and said plurality of said capacitive devices alternating in a nested configuration are configured to sequentially energize each of said capacitive devices of said plurality of capacitive devices to an associated predetermined voltage.

8. The electrical circuit in accordance with claim 1, wherein said controller comprises a comparator device.

9. The electrical circuit in accordance with claim 1, wherein said controller comprises a computer comprising a processor and a memory device coupled to said processor.

10. An electric power system comprising:
- an alternating current (AC) source;
- a direct current (DC) link; and
- a first power converter comprising an electrical circuit extending between said AC source and said DC link, said electrical circuit comprising:
  - an electrically conductive element;
  - a first switching device coupled to said electrically conductive element proximate said AC source;
  - a voltage measurement device coupled to said electrically conductive element proximate said DC link, wherein said electrical circuit extends between said AC source and said DC link;
  - a DC voltage source coupled to said electrically conductive element;
  - a first capacitive device coupled to said electrically conductive element, said first capacitive device positioned between said first switching device and said voltage measurement device;
  - a second switching device coupled to said electrically conductive element, said second switching device positioned between said first capacitive device and said voltage measurement device; and
  - a controller operatively coupled to said DC voltage source, said voltage measurement device, said first switching device, and said second switching device, said controller configured to open said second switching device when a measured voltage signal generated by said voltage measurement device is substantially representative of a reference voltage value.

11. The electric power system in accordance with claim 10 further comprising a second power converter coupled to said DC link, said second power converter substantially similar to said first power converter.

12. The electric power system in accordance with claim 10, wherein said first power converter and said second power converter are multilevel power converters.

13. The electric power system in accordance with claim 10 further comprising:
- a second capacitive device coupled to said electrically conductive element; and
- a third switching device coupled to said electrically conductive element, said second capacitive device positioned between said second switching device and said third switching device, and said third switching device positioned between said second capacitive device and said voltage measurement device.

14. The electric power system in accordance with claim 13, wherein said first capacitive device, said second switching device, said second capacitive device, and said third switching device define a plurality of said switching devices and a plurality of said capacitive devices alternating is a nested configuration.

15. The electric power system in accordance with claim 14, wherein said plurality of said switching devices and said plurality of said capacitive devices alternating is a nested configuration are configured to sequentially energize each of said capacitive devices of said plurality of capacitive devices to an associated predetermined voltage.

* * * * *